Sept. 30, 1924.

N. C. O. P. JACOBSEN 1,510,228

FANNING MILL GATE

Filed April 8, 1924   2 Sheets-Sheet 1

INVENTOR
*NELS C.O.P. JACOBSEN*
BY
ATTORNEY

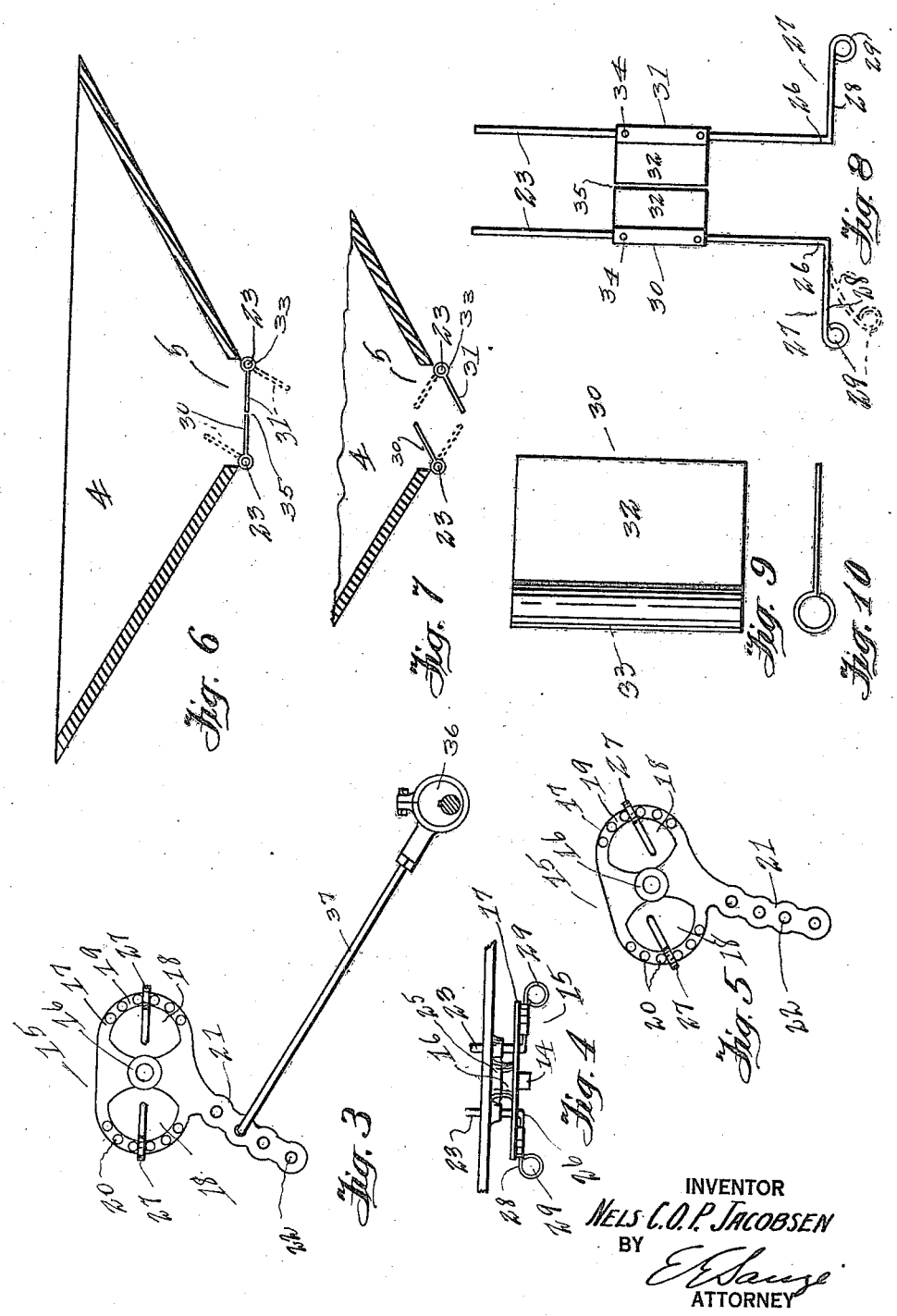

Patented Sept. 30, 1924.

1,510,228

UNITED STATES PATENT OFFICE.

NELS C. O. P. JACOBSEN, OF WALLA WALLA, WASHINGTON.

FANNING-MILL GATE.

Application filed April 8, 1924. Serial No. 704,907.

*To all whom it may concern:*

Be it known that I, NELS C. O. P. JACOBSEN, a citizen of the United States, residing at Walla Walla, in the county of Walla Walla and State of Washington, have invented certain new and useful Improvements in Fanning-Mill Gates, of which the following is a specification.

This invention relates to gates, of a type more particularly adapted to fanning mills, and has as one of its objects to provide a gate that is adapted for clean or foul grain, and that may remain stationary or be provided with oscillatory action, depending on the foulness of the grain.

Another object of the invention is to provide a gate having an oscillating motion, and that may be simply regulated as to the amount of oscillation and as to the size of the opening.

A further object of the invention is to provide a gate that may be oscillated by hand or power.

A further object of the invention is to provide a gate consisting of a pair of wings, and providing a means for regulating the opening thereof by the movement of either one or both of the wings.

With these and other objects of the invention in view reference is now had to the accompanying drawings in which Fig. 1 is a side elevation of a fanning mill showing the device installed;

Fig. 3 is a side elevation of the operating mechanism of the device;

Fig. 4 is a plan view of the rocker;

Fig. 5 is a side elevation of the rocker in an advanced position;

Fig. 6 is a section through the hopper showing the gate closed, taken on the line 6—6 of Fig. 2;

Fig. 7 is a similar view to Fig. 6 showing the gate open;

Fig 8 is a plan view of the wings and shafts therefor;

Fig. 9 is an enlarged view of one of the wings; and

Fig. 10 is an end elevation thereof.

Figure 1:
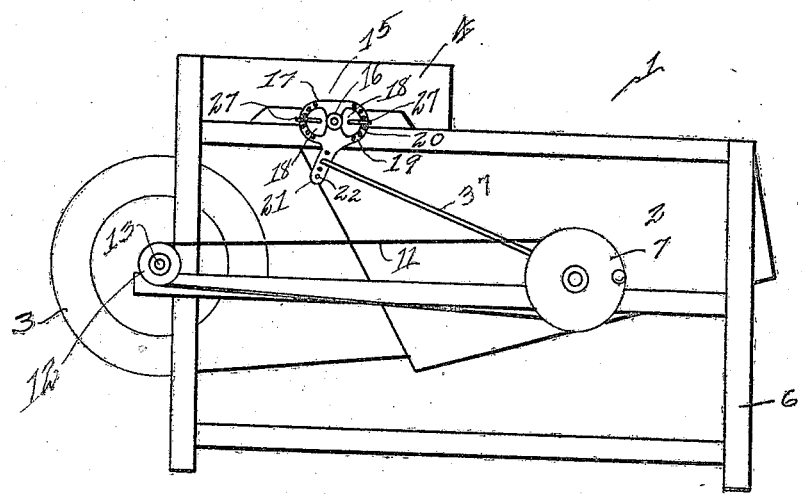
Figure 2:
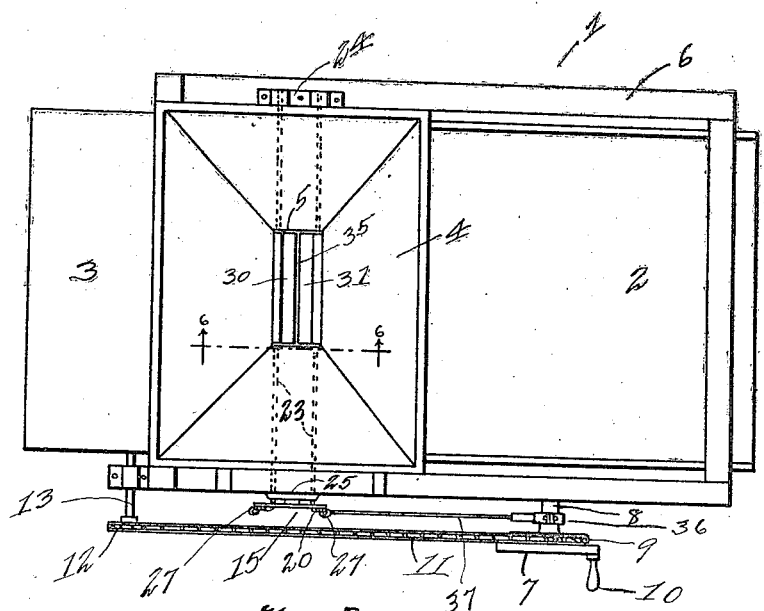
Fig. 2 is a plan view of the fanning mill.

Having reference to the drawings like numerals refer to like parts throughout the several views and the numeral 1 refers to a fanning mill provided with the usual shoe 2, fan 3, and hopper 4, the latter of which being provided with the customary outlet 5.

Attached to the framework 6 of the machine is a driving wheel 7 mounted on a drive shaft 8 and carrying a sprocket wheel 9, with a handle 10 attached to the drive wheel for the manual operation thereof. Obviously the machine may be operated by power by substituting a pully for the hand wheel and mechanically connecting the pully with the prime mover.

A chain 11 operably connects the sprocket wheel 9 with a sprocket wheel 12 attached to the fan shaft 13 wherewith to operate the fan 3.

Rotatably attached to the fanning mill by means of a stub shaft 14 is a rocker 15 consisting of a hub 16 positioned in the center of the rocker, a generally circular outer portion 17 arranged to provide apertures 18 on either side of the hub, or center, notches 19 arranged in the outer portion and formed by raising circular tits 20 therefrom, and further provided with a depending arm 21 having adjusting holes 22 disposed throughout its length.

A pair of shafts 23 positioned parallel are extended laterally through the fanning mill beneath the outlet 5 of the hopper, and are mounted in bearings 24 and 25 to provide for rotation or oscillation.

The shafts extend through the apertures 18 above mentioned and are provided on their ends 26 with yielding handles 27 bent in a generally right angle direction from the shafts.

The handles consist of a spring portion 28 with a loop or handle portion 29 formed on the end thereof, the spring portion permitting the yielding handle to be rotated for adjustable engagement with the notches 19 of the rocker.

The parallel position of the shafts require that the center thereof be positioned on both sides of the hub 16, and thus as the rocker oscillates the relative position of the shaft centers with the notches, is changed so that the radial line, i. e. the spring portion 28, will strike a notch in a more or less oblique direction, and to give as great a freedom of movement as possible without excessive lost motion the circular tits 20 are provided to give ample clearance for the spring portion in the notches regardless of the oblique position of said spring portion.

Within the outlet 5 of the hopper and rigidly attached to the shafts 22 are wing members 30 and 31 consisting of plates 32 and cylindrical portions 33 that slip onto the shafts to be secured thereto by rivets 34.

The wing members are so positioned that a slight clearance, as at 35, is provided to permit of a free movement of the members, whether rotative as when being adjusted by the movement of the handles to certain of the notches, or as oscillative as when being operated by and with the oscillating movement of the rocker.

The yielding handles 25 are extended radially in opposite directions to provide for a counterbalancing effect caused by the weight of the grain on the respective wing members, and hence the wing members may be adjusted to any position within the scope of the rocker and notches, without exerting a rotating influence on the rocker when stationary. And the same counterbalancing effect will become useful to assist the upward lift of one of the wings as the other is depressed during the oscillation of the rocker.

For this reason two wing members are to be preferred although a one wing gate would provide practically the same results, i. e. permitting the grain to pass, by acting against the side of the hopper outlet instead of acting against each other.

It is now obvious that the rocker may be stationary or may be oscillated, the latter being accomplished by means of an eccentric 36 operably attached to the drive shaft 8, for operation by that member as the drive wheel 7 is rotated, with a connecting rod 37 operably connecting the eccentric with the depending arm 21 at any one of the adjusting holes 22.

Now by establishing a simple loose, detachable connection between the end of the connecting rod and the depending arm, and by detaching the connecting rod, the fanning mill may be operated without effecting the rocker and this member will then remain stationary.

Where the connecting rod is disconnected and the rocker remains stationery, and it is desired to oscillate the wing members momentarily, as where a sudden clogging of the hopper occurs, the rocker may be oscillated by manual means, the depending arm being a desirable lever and handle for that purpose.

In use the grain to be cleaned is deposited in the hopper with the gate closed, as shown in Fig. 6. Now where the grain to be cleaned is comparatively free from unthreshed heads and other large stuff, the connecting rod will be disconnected and the wing members will be adjusted to the proper size of opening by rotating the yielding handles to the desired notches in the rocker. The mill is now operated by means of the drive wheel and the grain passes through the mill in the usual manner of such cleaning, being free to pass through the gate.

Where unthreshed heads and other larger stuff occurs the rocker is connected to the eccentric, utilizing the desired adjusting hole in the depending arm, and the cleaning operation carried on as before.

In this latter method the wing members oscillate in opposite directions and work past each other, and as the large stuff encounters the gate the stuff is either moved about until it passes through, or is caught between the edges of the plates and reduced in size until it will pass therethrough with freedom.

By means of this device the gate may be arranged in a multitude of positions with adjusting the size of the opening and regulating the length of oscillation, and by oscillation the grain in the hopper adjacent to the gate may be continually agitated, and whether the grain be exceptionally foul or relatively clean a constant and generally uniform flow will be obtained. And further as the wing members oscillate the gate opening will range from the maximum adjusted size to the completely closed position and will deposit the grain in the shoe in uniform ridges that will be readily levelled by the natural agitation of the shoe, and thus while the opening is large and permits the larger stuff to pass through the gate, the general flow is uniform, with the volume determined by the adjusted size of the opening of the gate.

The wings may be independently adjusted but must oscillate collectively.

Having thus described my invention, I claim:

1. In a fanning mill gate, a gate comprising a pair of wing members, movably mounted beneath the outlet of the hopper of said mill, means to independently adjust said wing members and means engagable with the adjusting means to collectively oscillate said wing members.

2. In a fanning mill gate, a rocker attached to said fanning mill, shafts engagable with said rocker, said shafts being positioned parallel and extended laterally of the mill beneath the outlet of the hopper of said mill, and mounted for rotation and oscillation, wing members rigidly attached to said shafts and positioned in the outlet of said hopper, means to oscillate said rocker and with it said wing members, and an adjusting means for regulating the oscillation of said rocker.

3. In a fanning mill gate, a rocker rotatably attached to said mill, and provided with a depending arm, shafts adjustably engagable with said rocker, wing members rigidly attached to said shafts for rotation and oscillation therewith, and positioned in the outlet of the hopper of said mill, and means attached to the drive shaft of the fanning mill and said depending arm to oscillate said rocker.

4. In a fanning mill gate, a notched rocker rotatably attached to said mill and provided with a depending arm, shafts adjustably engageable with said rocker, for adjustment and oscillation therewith, wing members rigidly attached to said shafts for adjustable rotation and oscillation therewith, and positioned in the outlet of the hopper of said mill, and an eccentric means operably attached to said mill and said depending arm for oscillating said rocker.

5. In a fanning mill gate, a pivotally mounted rocker attached to said mill, said rocker being provided with apertures, and having notches positioned about its outer portion, and further provided with a depending arm, shafts extending through said apertures and provided on their ends with yielding handles, said handles being positioned for adjustably engaging the said notches of the rocker, wing members rigidly attached to said shafts for adjustable rotation and oscillation therewith, and positioned in the outlet of the hopper of said mill, and an eccentric means attached to said mill and said defending arm, for oscillating said rocker.

6. In a fanning mill gate, a rocker rotatably attached to said mill, said rocker being provided with apertures positioned on either side of the center thereof, and further provided with a depending arm, shafts extending through said apertures and provided on their ends with yielding handles adjustably engageable with said rocker, said shafts being positioned parallel and extended laterally of the mill beneath the outlet of the hopper of said mill, and mounted for adjustable rotation and oscillation therein, wing members attached to said shaft for adjustable rotation and oscillation therewith, and positioned in the outlet of said hopper, an eccentric means detachably attached to the drive shaft of said mill and the depending arm, and an adjusting means for regulating the oscillation of said rocker.

In testimony whereof I affix my signature.

NELS C. O. P. JACOBSEN.